(12) United States Patent  (10) Patent No.: US 9,113,474 B2
Kim  (45) Date of Patent: Aug. 18, 2015

(54) METHOD AND APPARATUS FOR RESOURCE ALLOCATION

(75) Inventor: Jung Hyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 13/464,413

(22) Filed: May 4, 2012

(65) Prior Publication Data

US 2013/0017851 A1 Jan. 17, 2013

(30) Foreign Application Priority Data

Jul. 11, 2011 (KR) .................. 10-2011-0068228

(51) Int. Cl.
*H04W 72/04* (2009.01)

(52) U.S. Cl.
CPC ........ *H04W 72/048* (2013.01); *H04W 72/0406* (2013.01)

(58) Field of Classification Search
CPC .............................. H04W 84/08; H04L 47/10
USPC .......................................... 455/509; 370/252
See application file for complete search history.

(56) References Cited

U.S. PATENT DOCUMENTS

| | | | |
|---|---|---|---|
| 6,760,311 B1 * | 7/2004 | Raith | 370/252 |
| 7,797,506 B2 * | 9/2010 | Rangarajan et al. | 711/170 |
| 7,860,018 B2 * | 12/2010 | Raith | 370/252 |
| 8,150,446 B2 * | 4/2012 | Huan | 455/522 |
| 8,280,429 B2 * | 10/2012 | Huan | 455/522 |
| 8,615,276 B2 * | 12/2013 | Tanaka et al. | 455/574 |
| 8,687,575 B2 * | 4/2014 | Takaoka et al. | 370/329 |
| 8,914,511 B1 * | 12/2014 | Yemini et al. | 709/226 |
| 2004/0160901 A1 * | 8/2004 | Raith | 370/252 |
| 2004/0174833 A1 * | 9/2004 | Raith | 370/311 |
| 2008/0058000 A1 * | 3/2008 | Tanaka et al. | 455/550.1 |
| 2010/0323743 A1 * | 12/2010 | Huan | 455/522 |
| 2012/0135696 A1 * | 5/2012 | Lerzer et al. | 455/127.1 |
| 2012/0142394 A1 * | 6/2012 | Huan | 455/522 |

* cited by examiner

*Primary Examiner* — Hai V Nguyen
(74) *Attorney, Agent, or Firm* — Jefferson IP Law, LLP (57) ABSTRACT

A method and an apparatus for resource allocation are provided. The method includes measuring the temperature of the mobile terminal, sending, when the measured temperature exceeds an upper threshold temperature set in advance, a request for reduced resource allocation to a corresponding base station, receiving a message for reduced resource allocation corresponding to the sent request from the base station, and performing communication according to reduced resource allocation. Hence, the temperature of the mobile terminal can be kept within an appropriate range.

16 Claims, 4 Drawing Sheets

METHOD AND APPARATUS FOR RESOURCE ALLOCATION

PRIORITY

This application claims the benefit under 35 U.S.C. §119(a) of a Korean patent application filed on Jul. 11, 2011 in the Korean Intellectual Property Office and assigned Serial No. 10-2011-0068228, the entire disclosure of which is hereby incorporated by reference.

BACKGROUND OF THE INVENTION

1. Field of the Invention

The present invention relates to resource allocation in a mobile terminal. More particularly, the present invention relates to a method and an apparatus that regulate the amount of resources allocated to a mobile terminal to prevent overheating of the mobile terminal.

2. Description of the Related Art

Advances in mobile communication technologies have enabled worldwide popularization of mobile terminals. More particularly, mobile communication services based on the Long Term Evolution (LTE) standard have recently been commercially available. Compared with existing $3^{rd}$ Generation (3G) or $2^{nd}$ Generation (2G) mobile communication systems, LTE-based mobile communication provides significantly improved performance in terms of data transmission rate.

A mobile terminal supporting LTE-based communication may have to transmit, receive and process a large amount of data in a short time. Transmission, reception and processing of a large amount of data cause the mobile terminal to generate more heat. During usage of the mobile terminal, the user tends to grip the mobile terminal with the hand or to keep the mobile terminal in contact with the face.

A mobile terminal may overheat owing to transmission and reception of a large amount of data. Such an overheated mobile terminal may cause injury, such as a burn, to the user.

Therefore, a need exists for a method and an apparatus that can adequately regulate the temperature of a mobile terminal.

SUMMARY OF THE INVENTION

Aspects of the present invention are to address at least the above-mentioned problems and/or disadvantages and to provide at least the advantages described below. Accordingly, an aspect of the present invention is to provide a resource allocation method and an apparatus that can adequately regulate the temperature of a mobile terminal.

In accordance with an exemplary embodiment of the present invention, a method for resource allocation in a mobile terminal is provided. The method includes measuring the temperature of the mobile terminal, sending, when the measured temperature exceeds an upper threshold temperature set in advance, a request for reduced resource allocation to a corresponding base station, receiving a message for reduced resource allocation corresponding to the sent request from the base station, and performing communication according to reduced resource allocation.

In accordance with another exemplary embodiment of the present invention, a method for resource allocation in a base station is provided. The method includes receiving a measured temperature of a mobile terminal, sending, when the received temperature exceeds an upper threshold temperature set in advance, a message for reduced resource allocation to the mobile terminal, and performing communication with the mobile terminal according to reduced resource allocation.

In accordance with another exemplary embodiment of the present invention, a mobile terminal is provided. The mobile terminal includes a temperature sensor for measuring the temperature of the mobile terminal, and a wireless communication unit for sending, when the measured temperature exceeds an upper threshold temperature set in advance, a request for reduced resource allocation to a corresponding base station, for receiving a message for reduced resource allocation corresponding to the sent request from the base station, and for performing communication according to reduced resource allocation.

In accordance with another exemplary embodiment of the present invention, a base station capable of allocating resources to mobile terminals is provided. The base station includes a Base Station (BS) communication unit for receiving a measured temperature of a mobile terminal, and a resource allocation unit for sending, when the received temperature exceeds an upper threshold temperature set in advance, a message for reduced resource allocation to the mobile terminal, wherein the BS communication unit performs communication with the mobile terminal according to reduced resource allocation.

In an exemplary implementation, the method and apparatus can adequately regulate the temperature of a mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the drawings, some elements are exaggerated or only outlined in brief, and thus may not be drawn to scale. The same reference symbols are used throughout the drawings to refer to the same or like parts.

Hereafter, an exemplary resource allocation method and apparatus of the present invention are described with reference to the accompanying drawings.

In the following description, a resource allocation request is a message that is sent by a mobile terminal to a base station to request the base station to allocate resources to the mobile terminal. A resource allocation message is a message that is sent by the base station to the mobile terminal in response to a resource allocation request to allocate resources to the mobile terminal. The mobile terminal communicates with the base station using allocated resources.

A resource allocation request may be related to one of regular resource allocation and reduced resource allocation. A resource allocation message may also be related to one of regular resource allocation and reduced resource allocation. As will be described below, the base station sends a message for reduced resource allocation in return to a request for reduced resource allocation, and sends a message for regular resource allocation in return to a request for regular resource allocation. Compared with regular resource allocation, reduced resource allocation corresponds to resource reduction in at least one of bandwidth, a Transmission Time Interval (TTI), and a resource block. Resource allocation should be designed so that the mobile terminal performing communication based on reduced resource allocation can maintain a lower temperature in comparison to communication based on regular resource allocation. When communicating using regular resource allocation, the mobile terminal may maintain a higher temperature in comparison to communication based on reduced resource allocation. In an exemplary implementation, regular resource allocation may correspond to an existing resource allocation scheme. In another exemplary implementation, regular resource allocation may correspond to a new resource allocation scheme in which the mobile terminal may maintain a higher temperature in comparison to communication based on reduced resource allocation.

For example, for a mobile terminal, regular resource allocation may correspond to allocation of resources given by a bandwidth of 20 MHz or less, a TTI of 10 ms or less, and 100 or less resource blocks. Reduced resource allocation may correspond to allocation of resources given by a bandwidth of 10 MHz or less, a TTI of 5 ms or less, and 5 or less resource blocks.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
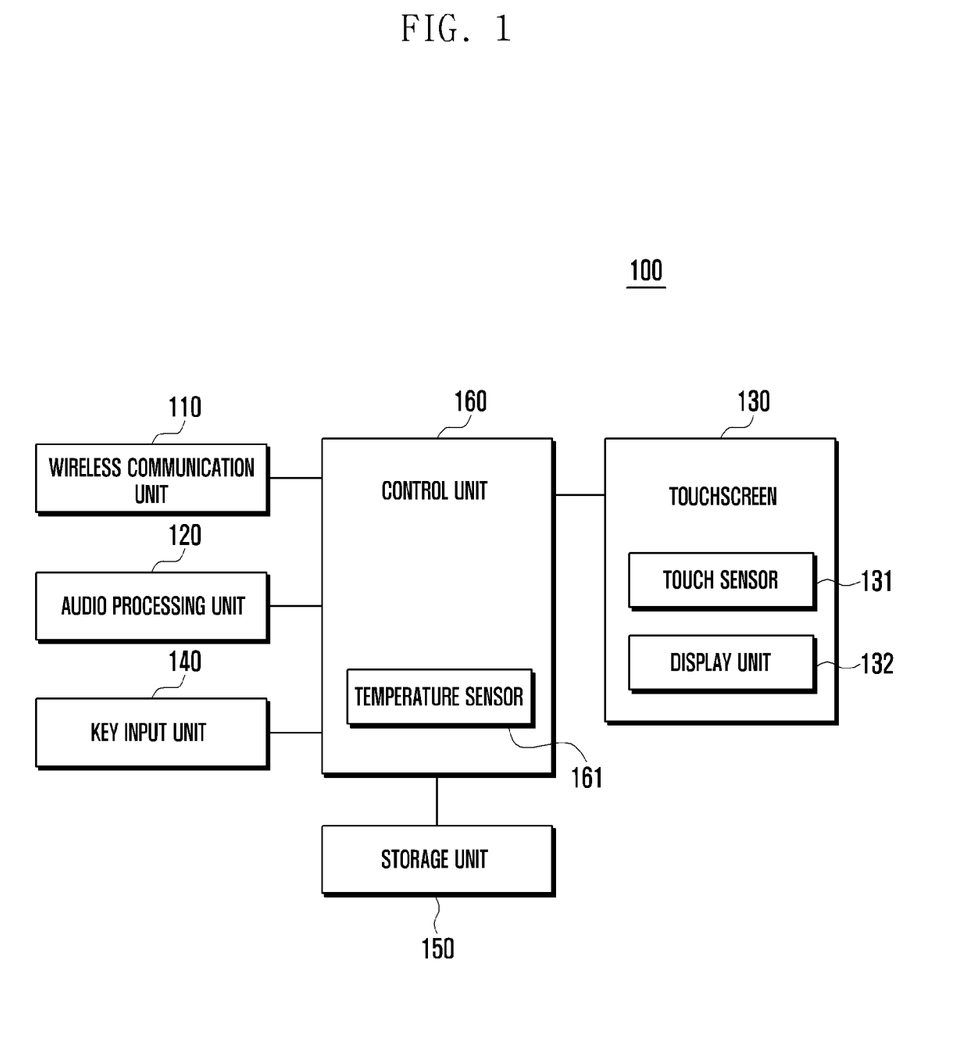
FIG. 1 is a block diagram of a mobile terminal according an exemplary embodiment of the present invention.

FIG. 1 is a block diagram of a mobile terminal according to an exemplary embodiment of the present invention.

Referring to FIG. 1, a mobile terminal 100 may include a wireless communication unit 110, an audio processing unit 120, a touchscreen 130, a key input unit 140, a storage unit 150, and a control unit 160.

The wireless communication unit 110 performs data transmission and reception for the mobile terminal 100. The wireless communication unit 110 may include a Radio Frequency (RF) transmitter for upconverting the frequency of a signal to be transmitted and for amplifying the signal, and an RF receiver for low-noise amplifying a received signal and for downconverting the frequency of the received signal. The wireless communication unit 110 may forward data received through a wireless channel to the control unit 160, and transmit data from the control unit 160 through the wireless channel.

More particularly in this exemplary implementation, the wireless communication unit 110 may send a request for resource allocation to a corresponding base station 200 according to the temperature measured by a temperature sensor 161 of the control unit 160, receive a resource allocation message from the base station 200, and communicate with the base station 200 using the allocated resources. A resource allocation request may be related to one of regular resource allocation and reduced resource allocation. The base station 200 sends a message for regular resource allocation in response to a request for regular resource allocation, and sends a message for reduced resource allocation in response to a request for reduced resource allocation. Compared with regular resource allocation, reduced resource allocation corresponds to resource reduction in at least one of bandwidth, a TTI, and a resource block.

In this exemplary implementation, the wireless communication unit 110 may send the temperature measured by the temperature sensor 161 to the base station 200. The base station 200 sends a message for resource allocation to the mobile terminal 100 according to the received temperature. The wireless communication unit 110 communicates with the base station 200 using the allocated resources.

Exemplary operations of the wireless communication unit 110 are described with reference to FIGS. 3 and 4.

The audio processing unit 120 may include a coder/decoder (codec). The codec may have a data codec for processing packet data and the like, and an audio codec for processing an audio signal, such as a voice signal. The audio processing unit 120 converts a digital audio signal into an analog audio signal through the audio codec to reproduce the analog audio signal using a speaker, and converts an analog audio signal from a microphone into a digital audio signal through the audio codec.

The touchscreen 130 includes a touch sensor 131 and a display unit 132. The touch sensor 131 detects a touch input of the user. The touch sensor 131 may be realized using a capacitive, a resistive, an infrared, or a pressure sensor. In an exemplary implementation, any sensor capable of detecting contact or pressure may be utilized as the touch sensor 131. The touch sensor 131 generates a touch signal corresponding to user touch and sends the touch signal to the control unit 160. The touch signal carries coordinate data of the touch point. When the user makes a touch-point move gesture, the touch sensor 131 generates a touch signal carrying coordinate data describing the path of the touch-point move and forwards the generated touch signal to the control unit 160.

More particularly, the touch sensor 131 may detect a user input (for example, a touch, a multi-touch, a drag, and the like) for displaying a group of object items in an unfolded or extended form.

The display unit 132 may be realized using Liquid Crystal Display (LCD) devices, Organic Light Emitting Diodes (OLEDs), or Active Matrix Organic Light Emitting Diodes (AMOLEDs). The display unit 132 provides various information, such as menus, input data and function-setting data to the user in a visual form. The display unit 132 may output a boot screen, an idle screen, a menu screen, a call handling screen and other application screens of the mobile terminal 100. More particularly, the display unit 132 may display the temperature measured by the temperature sensor 161.

Although the mobile terminal 100 is depicted as having a touchscreen capability, an exemplary embodiment of the present invention may be applied to a mobile terminal with or without a touchscreen capability. When an exemplary embodiment of the present invention is applied to a mobile terminal without a touchscreen capability, the function of the touchscreen 130 may be limited to that of the display unit 132.

The key input unit 140 generates an input signal corresponding to key manipulation of the user and sends the input signal to the control unit 160. The key input unit 140 may include a keypad including numeric and direction keys, and function keys attached to sides of the mobile terminal 100. When the mobile terminal 100 can be operated using only the touchscreen 130, the key input unit 140 may be excluded.

The storage unit 150 stores programs and data needed for operation of the mobile terminal 100, and may include a program area and a data area. The program area may store an operating system that boots the mobile terminal 100 and controls the overall operation thereof, application programs for playing back multimedia content, other application programs related to a camera module, sound reproduction, and playback of still or moving images. The data area is an area that stores data generated in the course of using the mobile terminal 100, and may store images, moving images, phonebooks, audio data, and the like.

The control unit 160 controls overall operations of individual components of the mobile terminal 100. More particularly, the control unit 160 includes a temperature sensor 161.

The temperature sensor 161 measures the temperature of the mobile terminal 100 at regular intervals or upon request. The temperature sensor 161 may forward the measured temperature to the wireless communication unit 110 under control of the control unit 160. As will be described below in connection with FIGS. 3 and 4, the wireless communication unit 110 may send a temperature or a request for reduced resource allocation to the base station 200 to regulate the temperature of the mobile terminal 100.

Referring to FIG. 1, the control unit 160 and the temperature sensor 161 are depicted as separate entities. This is only for ease of description. Alternatively, the control unit 160 and the temperature sensor 161 may be realized as a single entity, in which case the control unit 160 may directly assume the function of the temperature sensor 161.

Figure 3:
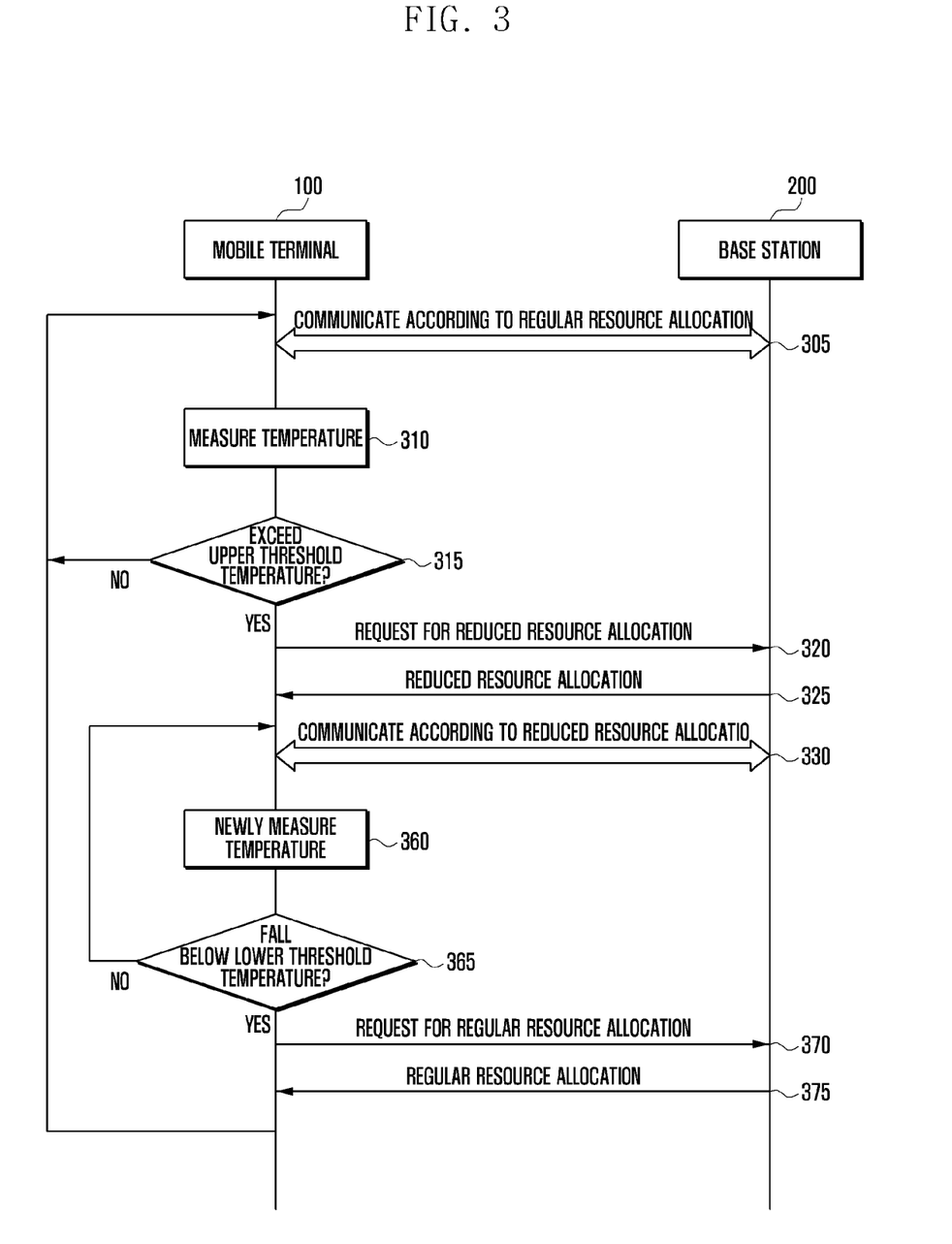
FIG. 3 is a sequence diagram of a procedure for resource allocation according to an exemplary embodiment of the present invention.
Figure 4:
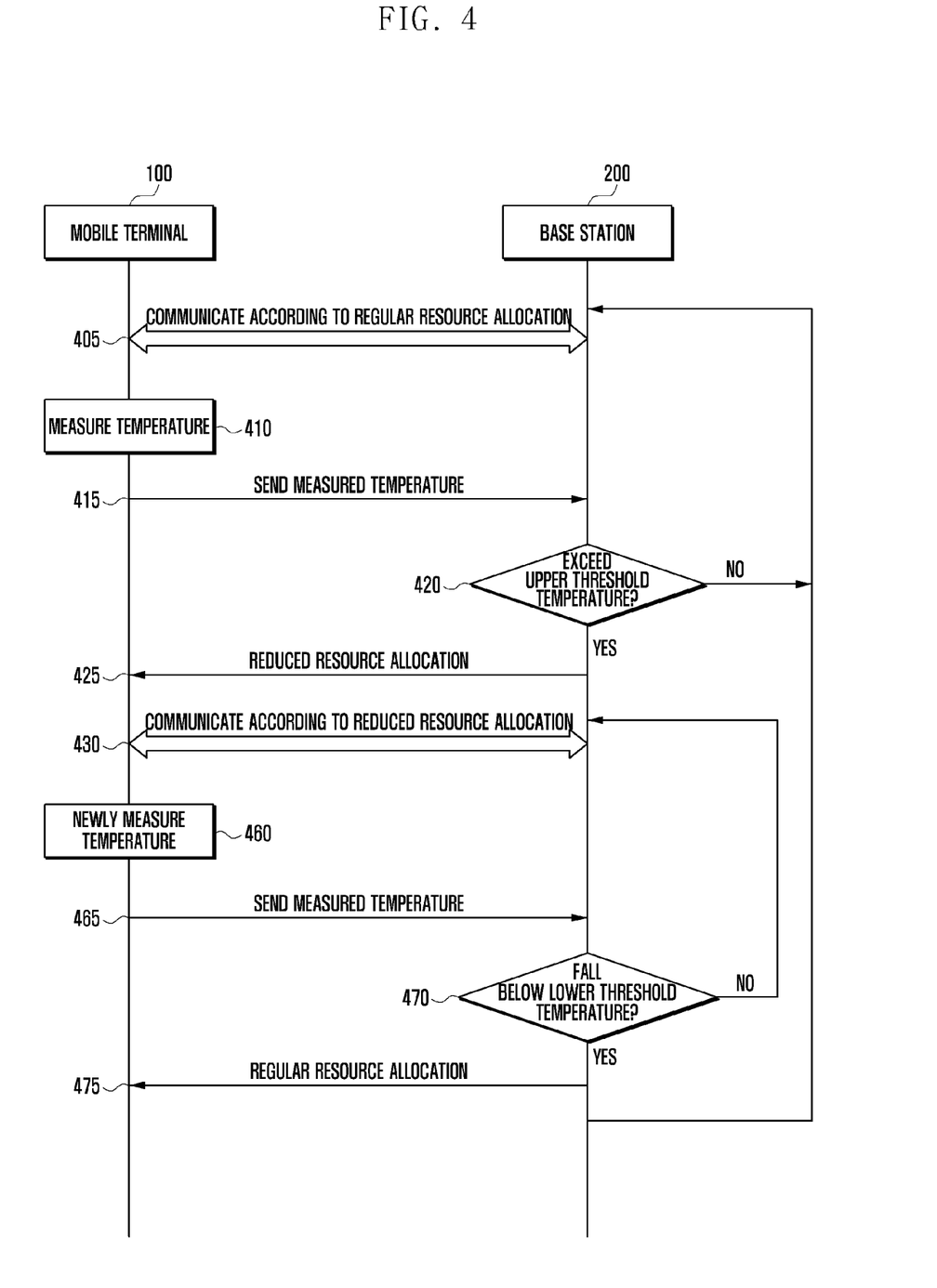
FIG. 4 is a sequence diagram of a procedure for resource allocation according to an exemplary embodiment of the present invention.

Operations of the individual components of the mobile terminal 100 are described further in connection with FIGS. 3 and 4.

Figure 2:
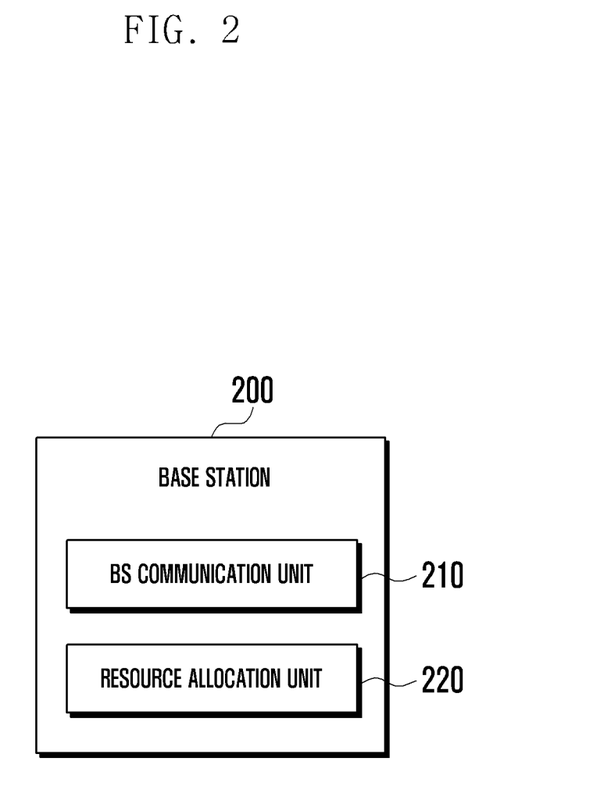
FIG. 2 is a block diagram of a base station according to an exemplary embodiment of the present invention.

FIG. 2 is a block diagram of a base station according to an exemplary embodiment of the present invention.

Referring to FIG. 2, a base station 200 may include a Base Station (BS) communication unit 210 and a resource allocation unit 220. The base station 200 may further include other components, such as a modulation module to communicate with mobile terminals. In FIG. 2, components not directly related to exemplary embodiments of the present invention are not shown.

The BS communication unit 210 communicates with the mobile terminal 100.

In an exemplary implementation, the BS communication unit 210 receives a request for resource allocation from the mobile terminal 100 and forwards the received request to the resource allocation unit 220. The resource allocation unit 220 sends a response message for resource allocation to the mobile terminal 100 through the BS communication unit 210. The BS communication unit 210 communicates with the mobile terminal 100 using the allocated resources. Here, a resource allocation request may be related to one of regular resource allocation and reduced resource allocation. Resource allocation may be performed in a regular form or in a reduced form. The base station 200 sends a message for regular resource allocation in response to a request for regular resource allocation, and sends a message for reduced resource allocation in response to a request for reduced resource allocation. Compared with regular resource allocation, reduced resource allocation corresponds to resource reduction in terms of at least one of bandwidth, a transmission time interval, and a resource block.

In an exemplary implementation, the BS communication unit 210 receives a temperature from the mobile terminal 100 and forwards the received temperature to the resource allocation unit 220. The resource allocation unit 220 sends a message for resource allocation to the mobile terminal 100 according to the received temperature. Here, resource allocation may be performed in a regular form or in a reduced form. The BS communication unit 210 communicates with the mobile terminal 100 using the allocated resources.

Exemplary operations of the individual components of the base station 200 are described further in connection with FIGS. 3 and 4.

FIG. 3 is a sequence diagram of a procedure for resource allocation according to an exemplary embodiment of the present invention.

Referring to FIG. 3, the mobile terminal 100 communicates with the base station 200 according to regular resource allocation at step 305.

During communication, the temperature sensor 161 of the mobile terminal 100 measures the temperature of the mobile terminal 100 at step 310. The temperature sensor 161 may include a detecting element to measure temperature.

The control unit 160 determines whether the measured temperature exceeds an upper threshold temperature set in advance at step 315. Here, the upper threshold temperature refers to the highest temperature of the mobile terminal 100 that is regarded as not causing damage like a burn to the user. For example, the upper threshold temperature may be set to 40 or 42 degrees Celsius. The upper threshold temperature may be set or reset according to user requirements, legal regulations, or manufacturer policies. In the following description, the upper threshold temperature is assumed to be set to 40 degrees Celsius.

When the measured temperature (for example, 36 degrees Celsius) does not exceed the upper threshold temperature, the control unit 160 returns to step 305 and continues communication according to regular resource allocation.

When the measured temperature (for example, 40.3 degrees Celsius) exceeds the upper threshold temperature, the control unit 160 proceeds to step 320.

In an exemplary implementation, the display unit 132 of the mobile terminal 100 may display the temperature measured by the temperature sensor 161. When the measured temperature exceeds the upper threshold temperature or falls below a lower threshold temperature, a corresponding alert may be output to the display unit 132. Such an alert may be output to the user in a visual form or in an audible form. In addition, the display unit 132 may display an indication indicating whether the mobile terminal 100 is in communication according to regular resource allocation or reduced resource allocation. The display unit 132 may output information to the user using text, images, and icons. The mobile terminal 100 may output information to the user through a display, a sound, and other means perceivable by the user.

The control unit 160 controls the wireless communication unit 110 to send a request for reduced resource allocation to the base station 200 at step 320. In response to the request, the resource allocation unit 220 of the base station 200 sends a message for reduced resource allocation to the mobile terminal 100 at step 325. Compared with regular resource allocation, reduced resource allocation corresponds to resource reduction in at least one of bandwidth, a transmission time interval, and a resource block.

Thereafter, the mobile terminal 100 communicates with the base station 200 according to reduced resource allocation at step 330. Reduced resource allocation is designed to keep the temperature of the mobile terminal 100 less than or equal to the upper threshold temperature. Compared to regular resource allocation, reduced resource allocation may correspond to resource reduction in at least one of bandwidth, a transmission time interval, and a resource block.

During communication according to reduced resource allocation, the temperature sensor 161 of the mobile terminal 100 newly measures the temperature of the mobile terminal 100 at step 360. The control unit 160 determines whether the measured temperature falls below a lower threshold temperature set in advance at step 365. For example, the lower threshold temperature may be lower than the upper threshold temperature by 2 degrees Celsius. The lower threshold temperature may be set or reset according to user requirements, legal regulations or manufacturer policies. In the following description, the lower threshold temperature is assumed to be set to 38 degrees Celsius. When the measured temperature (for example, 39 degrees Celsius) does not fall below the lower threshold temperature, the control unit 160 returns to step 330 and continues communication according to reduced resource allocation. When the measured temperature (for example, 37.6 degrees Celsius) falls below the lower threshold temperature, the control unit 160 regards the mobile terminal 100 as being sufficiently cool and controls the wireless communication unit 110 to send a request for regular resource allocation to the base station 200 at step 370. In return to the request, the base station 200 sends a message for regular resource allocation to the mobile terminal 100 at step 375. Thereafter, the mobile terminal 100 continues communication with the base station 200 according to regular resource allocation at step 305.

In FIG. 3, the mobile terminal 100 measures the temperature thereof and sends a request for regular or reduced resource allocation to the base station 200 according to the measured temperature. When the temperature is too high, the mobile terminal 100 sends a request for reduced resource allocation. In communication according to reduced resource allocation, when the temperature becomes sufficiently low, the mobile terminal 100 sends a request for regular resource allocation to the base station 200. Hence, the temperature of the mobile terminal 100 can be kept within an appropriate range. This prevents the mobile terminal 100 from being overheated, avoiding possible damage like a burn to the user.

FIG. 4 is a sequence diagram of a procedure for resource allocation according to an exemplary embodiment of the present invention. Whereas the mobile terminal 100 makes a determination as to the temperature in the exemplary embodiment of FIG. 3, the base station 200 makes a determination as to the temperature in the exemplary embodiment of FIG. 4.

Referring to FIG. 4, the mobile terminal 100 communicates with the base station 200 according to regular resource allocation at step 405. During communication, the temperature sensor 161 of the mobile terminal 100 measures the temperature of the mobile terminal 100 at step 410. The temperature sensor 161 may include a detecting element to measure temperature. The control unit 160 controls the wireless communication unit 110 to send the measured temperature to the base station 200 at step 415. The base station 200 determines whether the received temperature exceeds an upper threshold temperature set in advance at step 420. The upper threshold temperature is described before in connection with FIG. 3. Here, the upper threshold temperature is assumed to be set to 40 degrees Celsius. When the received temperature (for example, 39 degrees Celsius) does not exceed the upper threshold temperature, the base station 200 returns to step 405 and continues communication according to regular resource allocation. When the received temperature (for example, 40.3 degrees Celsius) exceeds the upper threshold temperature, the base station 200 proceeds to step 425.

In an exemplary implementation, the display unit 132 of the mobile terminal 100 may display the temperature measured by the temperature sensor 161. The display unit 132 may also display an indication indicating whether the mobile terminal 100 is in communication according to regular resource allocation or reduced resource allocation. The display unit 132 may output information to the user using text, images or icons. The mobile terminal 100 may output information to the user through a display, a sound, and other means perceivable to the user.

The resource allocation unit 220 of the base station 200 sends a message for reduced resource allocation to the mobile terminal 100 at step 425. This is to prevent overheating of the mobile terminal 100. Thereafter, the mobile terminal 100 communicates with the base station 200 according to reduced resource allocation at step 430.

During communication according to reduced resource allocation, the temperature sensor 161 of the mobile terminal 100 newly measures the temperature of the mobile terminal 100 at step 460. The control unit 160 controls the wireless communication unit 110 to send the measured temperature to the base station 200 at step 465. The base station 200 determines whether the received temperature falls below a lower threshold temperature set in advance at step 470. The lower threshold temperature has been described above in connection with FIG. 3. Here, the lower threshold temperature is assumed to be set to 38 degrees Celsius. When the received temperature (for example, 39 degrees Celsius) does not fall below the lower threshold temperature, the base station 200 returns to step 430 and continues communication with the mobile terminal 100 according to reduced resource allocation. When the received temperature (for example, 37.4 degrees Celsius) falls below the lower threshold temperature, the resource allocation unit 220 of the base station 200 sends a message for regular resource allocation to the mobile terminal 100 at step 475. Thereafter, the mobile terminal 100 continues communication with the base station 200 according to regular resource allocation at step 405.

In the exemplary embodiment of FIG. 4, the mobile terminal 100 measures the temperature thereof and sends the measured temperature to the base station 200. The base station 200 sends a message for regular or reduced resource allocation to the mobile terminal 100 according to the received temperature. Hence, the temperature of the mobile terminal 100 can be kept within an appropriate range.

It is known to those skilled in the art that blocks of a flowchart and a combination of flowcharts may be represented and executed by computer program instructions. These computer program instructions may be loaded on a processor of a general purpose computer, a special computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In exemplary embodiments of the present invention, the word "unit", "module" or the like may refer to a software component or a hardware component, such as a Field Programmable Gate Array (FPGA) or an Application Specific Integrated Circuit (ASIC) capable of carrying out a function or an operation. However, a "unit" or the like is not limited to a hardware component or a software component. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and a unit may be a combination of smaller components and units, and may be combined with others to compose large components and units. Components and units may be configured to drive a device or one or more processors in a secure multimedia card.

The mobile terminal of exemplary embodiments of the present invention may be a portable electronic device, such as a cellular phone, a smart phone, a Personal Digital Assistant (PDA), a navigation aid, a digital broadcast receiver or a Portable Multimedia Player (PMP).

Particular terms may be defined to describe exemplary embodiments of the present invention in the best manner. Accordingly, the meaning of specific terms or words used in the specification and the claims should not be limited to the literal or commonly employed sense, but should be construed in accordance with the spirit of the invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for resource allocation in a mobile terminal, the method comprising:
   measuring a temperature value of the mobile terminal;
   transmitting, if the measured temperature value exceeds an upper threshold temperature set in advance, a request for reduced resource allocation to a base station;
   receiving a message for reduced resource allocation corresponding to the sent request from the base station;
   performing communication according to reduced resource allocation;
   measuring the temperature value of the mobile terminal during communication according to reduced resource allocation; and
   transmitting, if the measured temperature value falls below a lower threshold temperature set in advance, a request for regular resource allocation to the base station.

2. The method of claim 1, further comprising:
   receiving a message for regular resource allocation corresponding to the sent request from the base station; and
   performing communication according to regular resource allocation.

3. The method of claim 2, wherein, compared with regular resource allocation, reduced resource allocation corresponds to resource reduction in at least one of bandwidth, a transmission time interval, and a number of resource blocks.

4. The method of claim 1, further comprising, when if the measured temperature value exceeds the upper threshold temperature, outputting at least one of a visual and an audible alert.

5. A method for resource allocation in a base station, the method comprising:
   receiving a measured temperature value of a mobile terminal;
   transmitting, if the received temperature value exceeds an upper threshold temperature set in advance, a message for reduced resource allocation to the mobile terminal;
   performing communication with the mobile terminal according to reduced resource allocation;
   receiving a measured temperature value of the mobile terminal during communication according to reduced resource allocation; and
   transmitting, if the measured temperature value falls below a lower threshold temperature set in advance, a message for regular resource allocation to the mobile terminal.

6. The method of claim 5, further comprising:
   performing communication with the mobile terminal according to regular resource allocation.

7. The method of claim 6, wherein, compared with regular resource allocation, reduced resource allocation corresponds to resource reduction in at least one of bandwidth, a transmission time interval, and a number of resource blocks.

8. The method of claim 5, wherein the mobile terminal measures the temperature value thereof and transmits the measured temperature value to the base station.

9. A mobile terminal comprising:
a temperature sensor configured to measure a temperature value of the mobile terminal; and
a wireless communication unit configured:
- to transmit, if the measured temperature value exceeds an upper threshold temperature set in advance, a request for reduced resource allocation to a base station,
- to receive a message for reduced resource allocation corresponding to the sent request from the base station, and
- to perform communication according to reduced resource allocation, wherein the temperature sensor measures the temperature value of the mobile terminal during communication according to reduced resource allocation, and
wherein the wireless communication unit transmits, if the measured temperature value falls below a lower threshold temperature set in advance, a request for regular resource allocation to the base station.

10. The mobile terminal of claim 9, wherein the wireless communication unit is further configured:
- to receive a message for regular resource allocation corresponding to the sent request from the base station, and
- to perform communication according to regular resource allocation.

11. The mobile terminal of claim 10, wherein, compared with regular resource allocation, reduced resource allocation corresponds to resource reduction in at least one of bandwidth, a transmission time interval, and a number of resource blocks.

12. The mobile terminal of claim 9, further comprising a control unit configured to output, if the measured temperature value exceeds the upper threshold temperature, at least one of a visual and an audible alert.

13. A base station capable of allocating resources to mobile terminal, the base station comprising:
a Base Station (BS) communication unit configured to receive a measured temperature value of the mobile terminal; and
a resource allocation unit configured to transmit, if the received temperature value exceeds an upper threshold temperature set in advance, a message for reduced resource allocation to the mobile terminal,
wherein the BS communication unit receives a measured temperature value of the mobile terminal during communication with the mobile terminal according to reduced resource allocation, and
wherein the resource allocation unit transmits, if the measured temperature value falls below a lower threshold temperature set in advance, a message for regular resource allocation to the mobile terminal.

14. The base station of claim 13, wherein the BS communication unit is further configured to perform communication with the mobile terminal according to regular resource allocation.

15. The base station of claim 14, wherein, compared with regular resource allocation, reduced resource allocation corresponds to resource reduction in at least one of bandwidth, a transmission time interval, and a number of resource blocks.

16. The base station of claim 13, wherein the mobile terminal measures the temperature value thereof and transmits the measured temperature value to the base station.

\* \* \* \* \*